US006399687B2

(12) United States Patent
Woods

(10) Patent No.: US 6,399,687 B2
(45) Date of Patent: Jun. 4, 2002

(54) HARDENABLE EXTERIOR TEXTURE MATERIAL IN AEROSOL FORM

(75) Inventor: John R. Woods, Woodland Hills, CA (US)

(73) Assignee: Spraytex, Inc., Valencia, CA (US)

( * ) Notice: Subject to any disclaimer, the term of this patent is extended or adjusted under 35 U.S.C. 154(b) by 0 days.

(21) Appl. No.: 09/775,061

(22) Filed: Feb. 1, 2001

Related U.S. Application Data

(62) Division of application No. 09/312,554, filed on May 14, 1999, now Pat. No. 6,225,393.

(51) Int. Cl.$^7$ ................................................. C08K 3/26

(52) U.S. Cl. ........................... 524/425; 221/1; 524/427; 524/445; 524/447

(58) Field of Search ................................. 524/425, 427, 524/445, 447; 222/1

(56) References Cited

U.S. PATENT DOCUMENTS

| | | | | |
|---|---|---|---|---|
| 5,450,983 A | * | 9/1995 | Stern et al. | 222/1 |
| 6,112,945 A | * | 9/2000 | Woods | 222/1 |

* cited by examiner

*Primary Examiner*—Edward J. Cain
(74) *Attorney, Agent, or Firm*—Pillsbury Winthrop LLP

(57) ABSTRACT

A hardenable texture material is disclosed for application to a patch surface surrounded by a stucco-like material having an irregular surface texture to form a layer of textured patch material on the patch surface, wherein the hardenable texture material is storable in a pressurized fluid-tight aerosol dispensing container. The hardenable texture material includes a liquid base and a stucco filler substance having large particulates resembling stucco. An aerosol system with a spray nozzle is included on the container for selective discharge of the hardenable texture material onto a prepared patch area so as to match and blend with the surrounding stucco-covered surface area in order to provide a continuous and unbroken coextensive surface texture of mechanically and visually matched material.

18 Claims, 1 Drawing Sheet

HARDENABLE EXTERIOR TEXTURE MATERIAL IN AEROSOL FORM

This is a divisional of application Ser. No. 09/312,554, filed May 14, 1999 U.S. Pat. No. 6,225,393

BACKGROUND OF THE INVENTION

1. Field of the Invention

The present invention relates, in general, to surface texture materials, and more particularly to a novel pressurized substance in liquid or semi-liquid form that is storable and dispensable from an air-tight pressurized container to be sprayed onto a stucco-covered surface so that after subsequent curing and hardening, the sprayed textured surface more closely resembles the original stucco-covered surface.

2. Brief Description of the Prior Art

It has been the conventional practice in the procedure of repairing stucco-covered surfaces to remove the damaged portion of the surface and subsequently fill any holes, depressions, or the like with a prepared patch material. The patch or replacement material is applied by means of a trowel or other flat tool that will press the patch material into the hole or depression and that will prepare and provide a surface area to receive a finish surface coating. After the patch material has cured and adhered to the original support material, a smooth surface is provided that receives the final coating. This coating leaves a smooth surface that is not matched to the surrounding roughened or textured surface, like that of stucco.

A stucco-covered surface usually presents a surface texture that is bumpy, or presents an irregular look and sometimes is referred to as a "Popcorn effect". Such an appearance and surface texture cannot be attained through the use of smoothing tools or patch tools once the patch material has been applied to the damaged or repaired area. Therefore, difficulties and problems have been encountered that stem largely from the fact that the use and application of conventional patching materials on repairs of stucco-covered surfaces leaves a surface texture that does not match the surrounding area and is noticeable after the repair has been completed.

With respect to conventional patch materials, prior means of dispensing such patch materials have included the use of air compressors or hand-operated spray pumps of the type used to dispense insect repellent. Often times, electric power was also necessary to drive these air compressors. These prior means are inadequate because they are time consuming in use and require substantial cleanup. Also, two hands are normally required for directional control of the discharge or spray.

U.S. Pat. No. 5,453,219 issued to Smrt et al. discloses an aerosol composition for producing a surface having an abrasive grit adhered thereto, which can be dispensed from a suitable aerosol container, said composition comprising abrasive grit, a binder solution that is suitable for affixing said grit onto the surface comprising a polymeric resin and an organic solvent that dissolves said resin, the resin being capable of adhering to said surface and to said grit, and a liquid propellant. The aerosol composition of the '219 patent, having only abrasive grit, does not provide a surface texture that is similar to stucco, where there are large particulates.

U.S. Pat. Nos. 5,341,970, 5,476,879, and 5,505,344 issued to the present Applicant disclose an acoustic ceiling patch or textured material in the form of a sprayable composition including a base, a filler, and a binder, as well as a propellant or carrier storable and dispensable from a pressurized container. The sprayable compositions of the '970, '879, and '344 patents, although textured, also do not resemble that of stucco, where large particulates are embedded within the material.

Therefore, a long-standing need has existed to provide a material that may be readily applied to a repaired patch or surface so that the repaired surface will match with the surrounding surface texture of a stucco-covered surface. Furthermore, there is a need for a stucco patch material that may be applied to a repaired or patched area and that may be contained in a hand-held applicator, requiring only one hand, so that the stucco patch material may be conveniently stored as well as applied to the repaired area in a simple and convenient manner.

SUMMARY OF THE INVENTION

An object of the present invention is to make patching exterior stucco and elastomeric exterior applications much more cost effective and faster to accomplish.

Another object of the present invention is to provide a stucco spray patch material that is storable and dispensable from a hand-held dispensing unit for spray-on and direct application of the material in a liquid or semi-liquid form onto a repaired or patched area so that the surrounding stucco surface texture will be visually and mechanically matched.

Another object of the present invention is to provide an inexpensive, practical and economical means for matching the surface texture of a repaired or patched surface area on a stucco-covered surface with the surrounding stucco surface texture.

Another object of the present invention is to improve the appearance of stucco patched or repaired areas on a stucco-covered surface by employing a spray-on textured material that covers the patched or repaired areas and visually assumes the surface texture of the surrounding stucco-covered surface.

Another object of the present invention is to enable efficient patching of exterior stucco and elastomeric applications by not requiring the use of air hoses or electricity.

An embodiment of the present invention relates to a hardenable texture material for application to a patch surface surrounded by a stucco material having an irregular surface texture to form a layer of textured patch material on the patch surface, wherein the hardenable texture material is storable in a fluid-tight dispensing container.

The hardenable texture material includes a liquid base, a stucco filler substance having large particulates resembling stucco, and a pressure source so that the stucco texture material may be applied by spray and will adhere to the repaired patch or stucco-covered surface. In an embodiment of the present invention, the hardenable texture material may include: a liquid base consisting of a vinyl, acrylic, or resin, and a stucco filler substance made of a mixture of limestone and clay.

The hardenable texture material described above is storable and dispensable from a convenient dispenser including a pressurized aerosol container holding a quantity of the hardenable texture material in a liquid or semi-liquid condition so that upon depression of a dispensing nozzle, the hardenable texture material will be discharged and directed to a patch area intended to receive the hardenable texture material. Furthermore, the hardenable texture material more closely resembles the texture of the original stucco-covered surfaces, allowing a better match for repairs of these surfaces. The hardenable texture material is inexpensive and easy to produce and may be sprayed from a hand-held dispenser, such as an aerosol spray can.

BRIEF DESCRIPTION OF THE DRAWINGS

A detailed description of embodiments of the invention will be made with reference to the accompanying drawings, wherein like numerals designate corresponding parts in the several figures.

DETAILED DESCRIPTION OF THE PREFERRED EMBODIMENTS

An embodiment of the present invention is directed to a hardenable texture material for application to a patch surface surrounded by a stucco-like material having an irregular surface texture to form a layer of textured patch material on the patch surface, wherein the hardenable texture material is storable in a fluid-tight aerosol dispensing container. The hardenable texture material presents a rough and grainy texture to the touch, and may be applied to any surface having an irregular surface texture.

An embodiment of the present invention is preferably comprised of a liquid base and a stucco filler substance having large particulates resembling stucco. The liquid base is preferably a vinyl, acrylic, resin, or other water resistant or waterproof base material. The liquid base may be a water-based material as well. The stucco filler substance may be any material that can serve as an extender or bodifier, preferably a mixture of limestone and clay. The hardenable texture material 15 may also further comprise an aggregate. The aggregate may be selected from or a combination of the following: sand, perlite, silica sand, and glass beads. Preferably, the hardenable texture material is stored under pressure in the aerosol dispensing container along with a propellant. The propellant may be any material suitable for use in an aerosol dispensing container, such as air, dimethyl ether, nitrogen, or any combination thereof.

Figure 3:
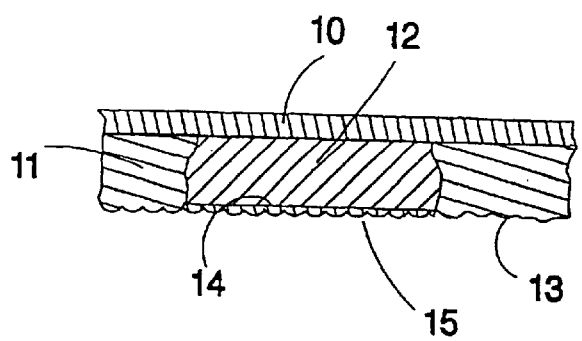
FIG. 3 is a transverse cross-sectional view of the repaired or patched area on a stucco-covered surface and illustrating matching of surface texture between the surface of the patch and the surrounding stucco-covered surface after use of the novel spray-on hardenable texture material of the present invention.

Referring in detail to FIG. 3, a transverse cross-sectional view of a typical building or structure surface is identified by numeral 10. The surface 10 supports the textured material 11, such as stucco, that has been damaged and a repair to the damaged area that takes the form of a patch 12. After curing, the patch becomes solidified and adheres to the edge marginal region of the textured material 11 and the surface 10 defining the area covered by the patch material 12. The surface texture of the original material 13 can be seen to be broadly defined as being bumpy, pebbled, or presenting an orange peel or a "popcorn" look.

Figure 1:
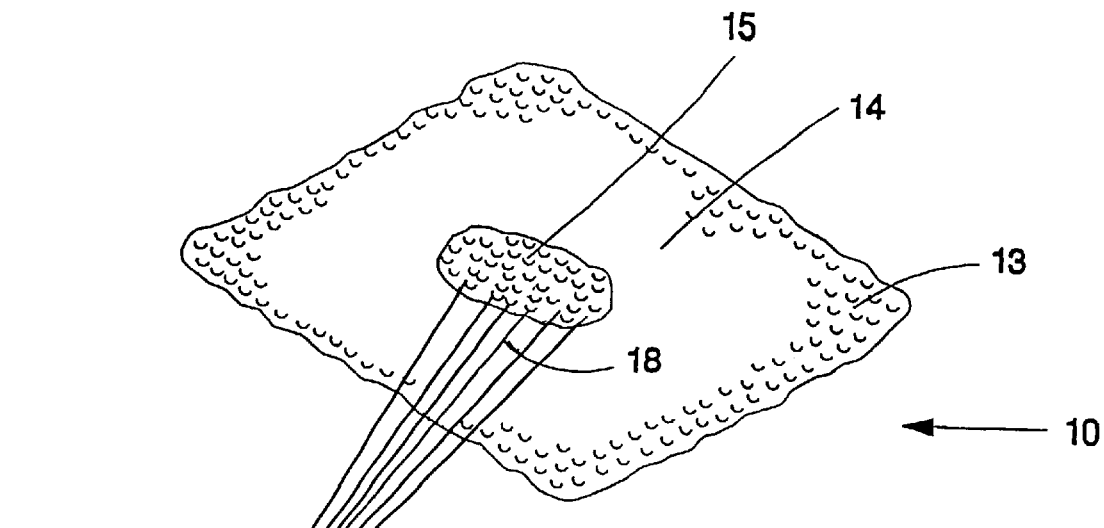
FIG. 1 is a pictorial view illustrating the direct application of the spray-on hardenable texture material from the aerosol dispenser of the present invention for repairing a stucco-covered surface.
Figure 2:
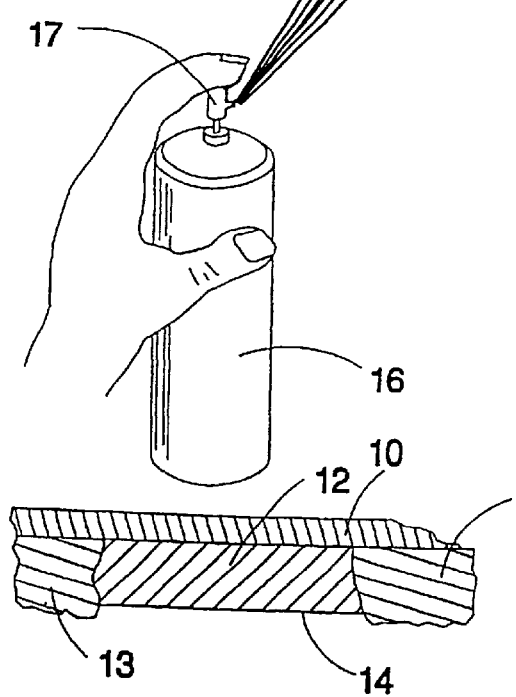
FIG. 2 is a transverse cross-sectional view of the repaired or patched area shown in FIG. 1 illustrating the dissimilarity in surface texture between the original stucco-covered surface and the surface of the patched areas.

FIG. 2 illustrates a transverse cross-sectional view of the repaired or patched area shown in FIG. 1, showing the dissimilarity in surface texture between the original stucco-covered surface and the surface of the patched areas. The patch 12 displays a smooth surface 14 usually attained by repeatedly drawing the edge of a hand tool, such as a trowel, across the surface 14. After drying or curing, the material of the patch 12 becomes hard and the surface remains smooth and unmatched with the surrounding irregular or raised surface 13 carried on the structure surface 10. Although the smooth surface 14 will accept a variety of coatings, such as paint or the like in a conventional situation, the surface texture of the coating will not simulate or blend with the surrounding irregular surface 13 of the original material 11. Visually, the flat patch area 14 will always be noticeable and indicate the presence of a repair.

Referring to FIGS. 1 and 3, the hardenable texture material 15 discharged from a dispenser 16 is illustrated as being applied to the smooth surface 14 of the patch 12. An example of an aerosol dispenser capable of spraying the hardenable texture material is disclosed in an accompanying patent application entitled, "Aerosol Valve Assembly for Spraying Viscous Materials or Materials with Large Particulates," incorporated herein by reference. In this connection, a bumpy and irregular surface is placed on the flat surface 14 so as to be compatible with, blend with, and be coextensive with the surrounding surface material 13. By employment of the present invention, the surface texture of both the patch 12 and the surrounding surface material 13 are substantially identical and matched so that no visual indication is presented or noticeable pertaining to a repair or patch. The material being applied, broadly indicated by numeral 15, is contained within the dispenser container 16 and applied in the form of a spray 18 in either liquid or semi-liquid condition. Application is achieved by depression of a pump or spray nozzle 17 that permits discharge of the pressurized hardenable texture material 15 carried within the container 16. Such an application of the material occurs directly on the desired area 14 by the user who hand-carries the container 16 and operates the nozzle 17 on site with one hand. Waste and loss of material is avoided because the discharge is under the control of the user through the application of the discharge nozzle 17. There may also be a push button actuator on the top of the dispenser container 16 connected to a spray nozzle. An example of a spray nozzle that may be used with the actuator is the "Adjustable Spray Nozzle" based upon U.S. patent application Ser. No. 08/823,902, filed by John Woods and assigned to SprayTex Corporation, incorporated herein by reference. Therefore, there is no residue or excess material that is not used which requires disposal. Furthermore, the hardenable texture material 15 is lumpy and, after curing on the patch surface 14, provides an irregular surface compatible and matching the surrounding stucco-covered surface area. Furthermore, the material in the container is considered a finished product and does not require additives of any kind. The labeling on the container may provide identification numbers and laboratory information.

In one embodiment of the present invention, the hardenable texture material 15 may have the following composition by percentage weight:

| | |
|---|---|
| liquid base | 10% to 80% |
| stucco filler substance limestone | 35% to 65% |
| stucco filler substance clay | 5% to 25% |
| aggregate | 5% to 30% |

Preferably, the large particulates of the stucco filler substance should have a particulate size of approximately $\frac{1}{30}$ cubic inches ($\frac{1}{30}$ in.$^3$) to $\frac{1}{8}$ cubic inches ($\frac{1}{8}$ in.$^3$).

Furthermore, the composition of the hardenable texture material 15, as described above, may contain an anti-freeze, such as propylene glycol, and a fungicide to prevent growth on the hardenable texture material 15 after its application.

As illustrated in FIG. 1, the hardenable texture material may be applied directly to the smooth surface 14, and when dried or cured, results in an irregular surface having a texture compatible and matched with the surrounding surface texture of the stucco-covered surface. The patch material 12 is dried and cured in preparation for receiving the hardenable texture material 15. Even if small amounts of the hardenable texture material 15 would extend beyond the surface 14 onto the surrounding material 13, the surface would still be matched and no unsightly patch edges or dissimilar surface texture would be detectable.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. A method for repairing an irregular surface texture material, the method comprising the steps of:
    storing a hardenable texture material for application to a patch surface surrounded by a stucco-like material having an irregular surface texture in a fluid-tight aerosol dispensing container, the hardenable texture material comprising a mixture of,
        a liquid base wherein the liquid base consists essentially of a water-resistant material, the liquid base having a composition by percentage weight of 10% to 80% of the hardenable texture material, and
        a stucco filler substance having large particulates resembling stucco wherein the stucco filler substance consists essentially of a mixture of limestone and clay, the limestone of the stucco filler substance having a composition percentage weight of approximately 35% to 65% of the hardenable texture material, and the clay of the stucco filler substance having a composition percentage weight of approximately 5% to 25% of the hardenable texture material, and the large particulates having a particulate size of approximately $\frac{1}{30}$ cubic inches ($\frac{1}{30}$ in.$^3$) to $\frac{1}{8}$ cubic inches ($\frac{1}{8}$ in.$^3$),
        wherein the fluid-tight aerosol dispensing container has a nozzle attached to the fluid-tight aerosol dispensing container for dispensing the hardenable texture material using a pressure from the fluid-tight aerosol dispensing container in the form of an aerosol spray; and
    selectively dispensing the hardenable texture material onto the patch surface such that the hardenable texture material forms a layer having a bumpy, irregular surface texture after being dispensed that matches and is compatible with the stucco-like material surrounding the patch surface.

2. The method for repairing the irregular surface texture material according to claim 1, wherein the water-resistant material is a vinyl.

3. The method for repairing the irregular surface texture material according to claim 1, wherein the water-resistant material is an acrylic.

4. The method for repairing the irregular surface texture material according to claim 1, wherein the water-resistant material is polyvinyl alcohol.

5. The method for repairing the irregular surface texture material according to claim 1, wherein the water-resistant material is a resin.

6. The method for repairing the irregular surface texture material according to claim 1, wherein in the step of storing the hardenable texture material for application to a patch surface, the hardenable texture material further comprises an aggregate wherein the aggregate consists essentially of perlite, the aggregate having a composition percentage weight of approximately 5% to 30% of the hardenable texture material.

7. The method for repairing the irregular surface texture material according to claim 1, wherein in the step of storing the hardenable texture material for application to a patch surface, the hardenable texture material further comprises an aggregate wherein the aggregate consists essentially of sand, the aggregate having a composition percentage weight of approximately 5% to 30% of the hardenable texture material.

8. The method for repairing the irregular surface texture material according to claim 1, wherein in the step of storing the hardenable texture material for application to a patch surface, the hardenable texture material further comprises an aggregate wherein the aggregate consists essentially of silica sand, the aggregate having a composition percentage weight of approximately 5% to 30% of the hardenable texture material.

9. The method for repairing the irregular surface texture material according to claim 1, wherein in the step of storing the hardenable texture material for application to a patch surface, the hardenable texture material further comprises an aggregate wherein the aggregate consists essentially of glass beads, the aggregate having a composition percentage weight of approximately 5% to 30% of the hardenable texture material.

10. The method for repairing the irregular surface texture material according to claim 1, wherein in the step of storing the hardenable texture material for application to a patch surface, the hardenable texture material further comprises an anti-freeze.

11. The method for repairing the irregular surface texture material according to claim 10, wherein in the step of storing the hardenable texture material for application to a patch surface, the anti-freeze consists essentially of propylene glycol.

12. The method for repairing the irregular surface texture material according to claim 1, wherein in the step of storing the hardenable texture material for application to a patch surface, the hardenable texture material further comprises a fungicide.

13. A method for repairing an irregular surface texture material, the method comprising the steps of:
    storing a hardenable texture material for application to a patch surface surrounded by a stucco-like material having an irregular surface texture in a fluid-tight aerosol dispensing container, the hardenable texture material comprising a mixture of,
        a liquid base wherein the liquid base consists essentially of a water-resistant material, the liquid base having a composition by percentage weight of 10% to 80% of the hardenable texture material, a stucco filler substance having large particulates resembling stucco wherein the stucco filler substance consists essentially of a mixture of limestone and clay, the limestone of the stucco filler substance having a composition percentage weight of approximately 35% to 65% of the hardenable texture material, and the clay of the stucco filler substance having a composition percentage weight of approximately 5% to 25% of the hardenable texture material, and the large particulates having a particulate size of approximately 1/30 cubic inches (1/30 in.$^3$) to 1/8 cubic inches (1/8 in.$^3$), an aggregate wherein the aggregate is a material selected from the group consisting of sand, perlite, silica sand, and glass beads, the aggregate having a composition percentage weight of approximately 5% to 30% of the hardenable texture material, an anti-freeze, and a fungicide, wherein the fluid-tight aerosol dispensing container has a nozzle attached to the fluid-tight aerosol dispensing container for dispensing the hardenable texture material using a pressure from the fluid-tight aerosol dispensing container in the form of an aerosol spray; and selectively dispensing the hardenable texture material onto the patch surface such that the hardenable texture material forms a layer having a bumpy, irregular surface texture after being dispensed that matches and is compatible with the stucco-like material surrounding the patch surface.

14. The method for repairing the irregular surface texture material according to claim 13, wherein the water-resistant material is a vinyl.

15. The method for repairing the irregular surface texture material according to claim 13, wherein the water-resistant material is an acrylic.

16. The method for repairing the irregular surface texture material according to claim 13, wherein the water-resistant material is polyvinyl alcohol.

17. The method for repairing the irregular surface texture material according to claim 13, wherein the water-resistant material is a resin.

18. The method for repairing the irregular surface texture material according to claim 13, wherein the anti-freeze consists essentially of propylene glycol.

* * * * *